(12) United States Patent
Livingston

(10) Patent No.: US 11,568,384 B2
(45) Date of Patent: Jan. 31, 2023

(54) CRYPTOCURRENCY TRANSACTIONS WITH SYNCHRONIZED IMAGES

(71) Applicant: CODE INC., Kitchener (CA)

(72) Inventor: Ted Livingston, Kitchener (CA)

(73) Assignee: CODE INC., Kitchener (CA)

( * ) Notice: Subject to any disclaimer, the term of this patent is extended or adjusted under 35 U.S.C. 154(b) by 188 days.

(21) Appl. No.: 17/112,001

(22) Filed: Dec. 4, 2020

(65) Prior Publication Data

US 2022/0180350 A1 Jun. 9, 2022

(51) Int. Cl.

| | |
|---|---|
| *G06Q 20/32* | (2012.01) |
| *G09G 5/12* | (2006.01) |
| *G06Q 20/06* | (2012.01) |
| *G06Q 40/04* | (2012.01) |
| *G06K 7/10* | (2006.01) |
| *H04L 9/32* | (2006.01) |
| *G06K 7/14* | (2006.01) |
| *G06K 19/06* | (2006.01) |

(52) U.S. Cl.
CPC ....... *G06Q 20/3276* (2013.01); *G06K 7/1095* (2013.01); *G06K 7/1413* (2013.01); *G06K 7/1417* (2013.01); *G06K 19/06028* (2013.01); *G06K 19/06037* (2013.01); *G06K 19/06103* (2013.01); *G06K 19/06112* (2013.01); *G06Q 20/0655* (2013.01); *G06Q 20/3274* (2013.01); *G06Q 40/04* (2013.01); *G09G 5/12* (2013.01); *H04L 9/32* (2013.01)

(58) Field of Classification Search
None
See application file for complete search history.

(56) References Cited

U.S. PATENT DOCUMENTS

| | | | |
|---|---|---|---|
| 2017/0052685 A1* | 2/2017 | Kovacs | H04W 4/21 |
| 2018/0075442 A1* | 3/2018 | Tyler | G06Q 20/3276 |
| 2018/0253207 A1* | 9/2018 | Wang | G06F 3/04883 |

* cited by examiner

*Primary Examiner* — Kristy A Haupt
(74) *Attorney, Agent, or Firm* — Perry + Currier Inc.

(57) ABSTRACT

A value is exchanged between accounts held by users of two portable electronic devices. The devices synchronize disappearance of the image at the sending device and appearance of the image at the receiving device to give the impression that a physical object representative of the value has been exchanged (e.g., handed) between the users.

12 Claims, 4 Drawing Sheets

Frame A     Frame B     Frame C     Frame D

US 11,568,384 B2

CRYPTOCURRENCY TRANSACTIONS WITH SYNCHRONIZED IMAGES

BACKGROUND

Computerized currencies and payment systems, such as cryptocurrencies, allow people to exchange money without having to exchange a banknote, check, or other physical object.

BRIEF DESCRIPTION OF THE DRAWINGS

FIGS. 1A to 1C are schematic diagrams of two portable electronic devices participating in a transfer of a value using synchronized disappearance and appearance of an image representative of the value, in which FIG. 1A shows the sending device with the image, FIG. 1B shows the receiving device capturing the image, and FIG. 1C shows the receiving device with the image.

DETAILED DESCRIPTION

The adoption of certain kinds of computerized currencies and payment systems has been limited due to their cumbersome or unintuitive nature. Cryptocurrencies, such as Bitcoin and Ethereum, are often only appealing to tech-savvy people who can understand their use. The average person faces may obstacles in understanding and using the typical cryptocurrency. Even those skilled in computer technologies may have difficulty using cryptocurrency. And even when usage is understood, there are often many steps to actually participating in a transfer.

The present disclosure aims to simplify the usage of computerized currencies and payment systems by providing techniques for the intuitive and fast exchange of value. This is contemplated to help more people become comfortable with using computerized currencies and payment systems.

Figure 1A:
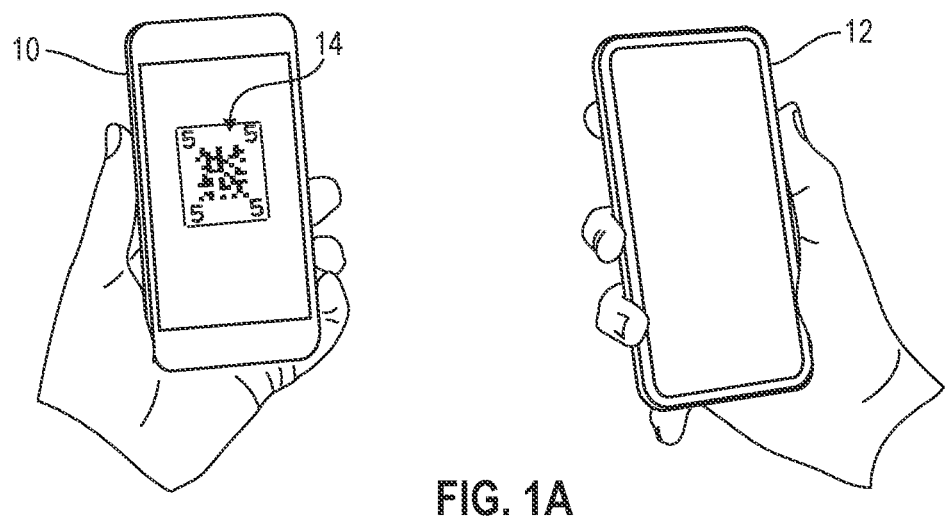
Figure 1B:
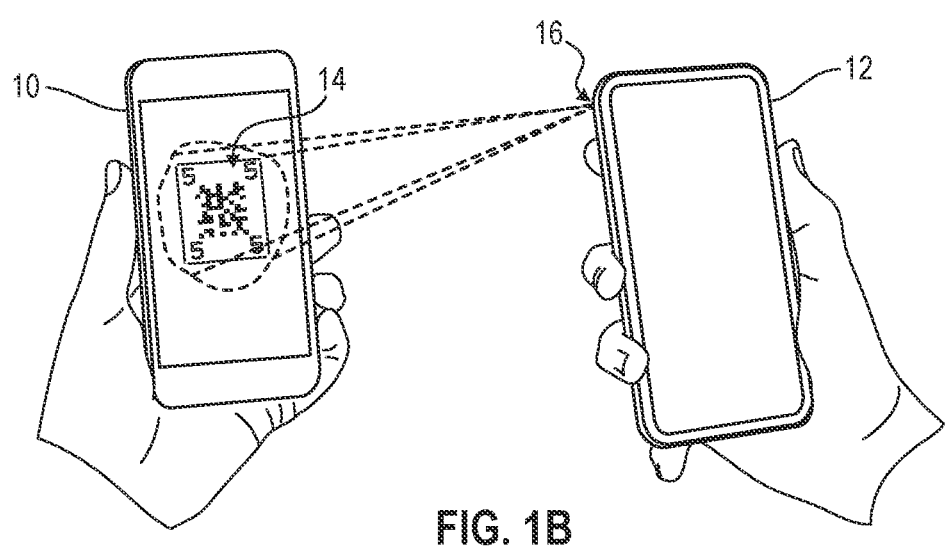
Figure 1C:
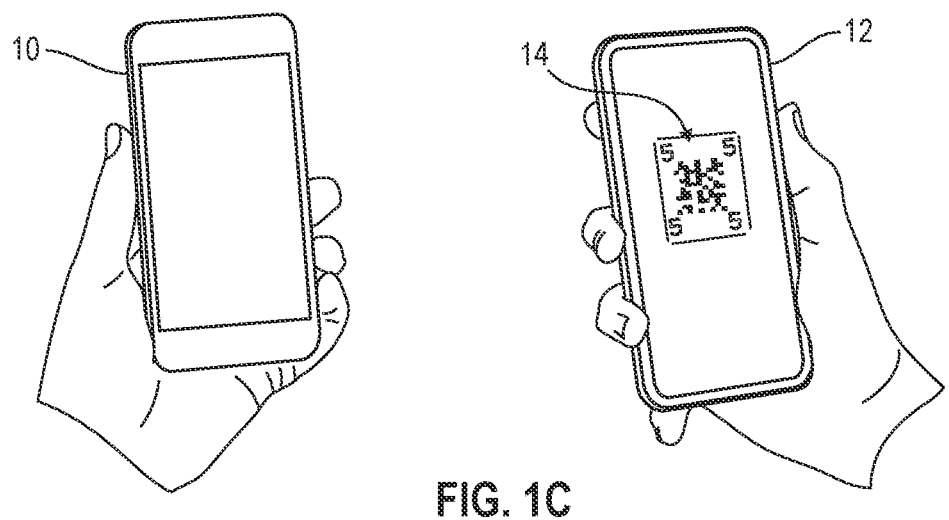

With reference to FIGS. 1A to 1C, which shows an example transaction, the present disclosure aims to improve the usability of computerized currencies and payment systems, particularly cryptocurrencies that may be exchanged using portable electronic devices, such as smartphones 10, 12. Two users who wish to transfer an amount of a cryptocurrency between them ready their smartphones 10, 12. The user sending the money has an image 14 representing the money appear on the screen of their phone 10. The user receiving the money then scans the image using their phone's camera 16. The scanning initiates the underlying transaction, which may occur at a server system at which the users hold accounts (e.g., in the cloud). Once the transaction is complete, the phones 10, 12 synchronize the disappearance of the image 14 from the sending user's phone with the appearance of the image 14 at the receiving user's phone, so as to visually simulate the physical conveyance of a physical object, such as a banknote, represented by the image 14. The synchronization of the disappearance and appearance of the image 14 provides the illusion of the users exchanging a physical object representative of the value exchanged. The users may thus feel that the transaction has been completed with the same permanence as the exchanging of cash. The analogy is that the sending user pulled some cash from their wallet or purse by displaying the image 14, held the cash out by holding out their smartphone 10, and that the receiving user took the cash in their hand by scanning image 14 with their smartphone 12. The image 14 appears to move or jump from one phone to another in much the same way that a bill moves from one person's hand to another.

Figure 2:
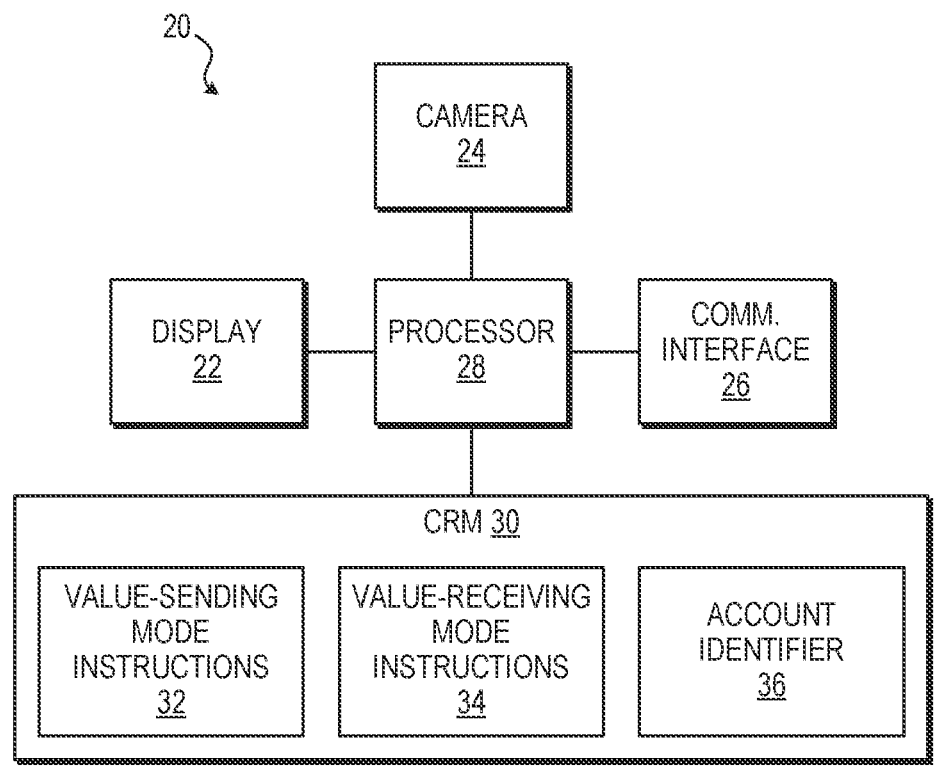
FIG. 2 is a block diagram of an example portable electronic device to synchronize the disappearance and/or appearance of an image representative of a value of a transaction conducted using the portable electronic device.

FIG. 2 shows an example portable electronic device 20 which may be used as either or both of the smartphones 10, 12 discussed above.

The device 20 includes a display device 22, a camera 24, a communications interface 26, and a processor 28 connected to the display device 22, the camera 24, and the communications interface 26. The device 20 may include additional components, such as those normally found in a smartphone or tablet computer, and these are not discussed for sake of clarity.

The device 20 may further include a non-transitory computer-readable medium (CRM) 30, which may be a combination volatile and non-volatile memory, such as dynamic random-access memory (DRAM) and flash memory. The processor 28 may be connected to the CRM 30 to perform operations, such as storing and retrieving data and executing program code to perform the functionality discussed herein. Program code may be stored in the CRM 30 and may include instructions, which may be directly executable (e.g., a binary file) or indirectly executable (e.g., bytecode).

The device 20 may operate in a value-sending mode, as with device 10 above. The value-sending mode may be realized by value-sending mode instructions 32 stored in the CRM 30. The device 20 may also operate in a value-receiving mode, as with the device 12 above. The value-receiving mode may be realized by value-receiving mode instructions 34 stored in the CRM 30. The instructions 32, 34 may communicate with a service that provides for the exchange of value, such as cryptocurrency, via the communications interface 26. Such a service may use a blockchain to record transactions.

The device 20 may be associated with an account with the service. As such, the CRM 30 may store account identifier 36. The account identifier 36 associates the device 20 with an account at the service and allows the device to send or receive value via the service. The instructions 32, 24 may reference the account identifier 36 to transfer value at the service in an authorized manner. The instructions 32, 34 may require that the user of the device 20 authenticate themselves by entering a username/password or by providing a biometric (e.g., a fingerprint or face scan). The instructions 32, 34 may communicate with the service via the communications interface 26 to authenticate the user. The user may choose to remain authenticated for a period of time, such as 1 day, 30 days, 90 days, 1 year, or until the user logs out.

The device 20 may include an application or "app" that implements the functionality discussed herein, including the value-sending mode, value-receiving mode, account log in, image capture, image appearance/disappearance, etc.

Figure 3:
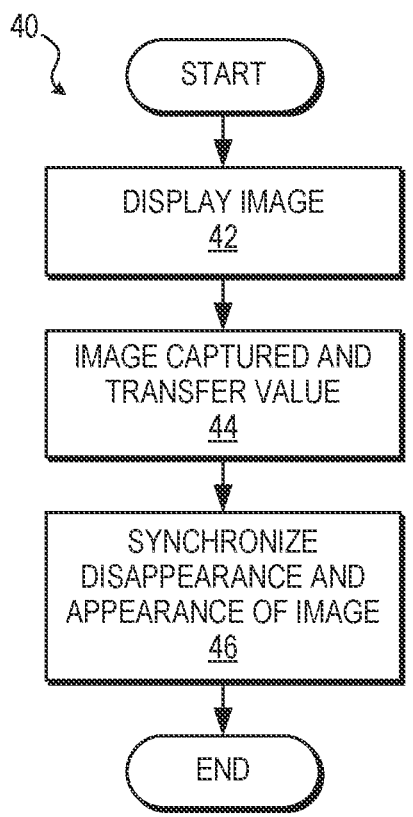
FIG. 3 is a flowchart of a method of sending a value with synchronized disappearance and appearance of an image representative of the value at respective sending and receiving devices.

With reference to FIG. 3, the value-sending mode instructions 32 may implement a value-sending method 40 at the device 20 to transfer a value to an account of another device 20 operating in the value-receiving mode.

At block 42, the display device 22 is controlled to display an image representative of a value to be sent from the account associated with the portable electronic device 20 to the account associated with the other portable electronic device 20 that is in the value-receiving mode. As a condition to displaying such an image, the sending device 20 may authenticate the user of the sending device 20 with the service with respect to the sending account identified by the account identifier 26 and confirm that the account contains at least the value desired to be transferred. Authentication may be done once for a period of time in advance of the transaction, so the transaction may be carried out smoothly.

At block 44, the communications interface 26 is controlled to participate in a transfer of the value to be sent between the accounts in response to the other portable electronic device 20 capturing the image with its camera 24. As a condition to allowing capture of the image, the receiving device 20 may first authenticate the user of the receiving device 20 with the service with respect to the receiving account identified by the account identifier 26. As with sending, authentication may be done once for a period of time in advance of the transaction, so the transaction may be carried out smoothly. The transfer of value may be executed by the service. That is, the value may be removed from the sending account and added to the receiving account. This may include adding information to a blockchain.

At block 46, the disappearance of the image from the display device 22 of the sending device 20 is synchronized with the appearance of the image at the receiving device 20, so as to give the users of the devices 20 the impression that something physical has changed hands to complement the transfer of value at the service.

Figure 4:
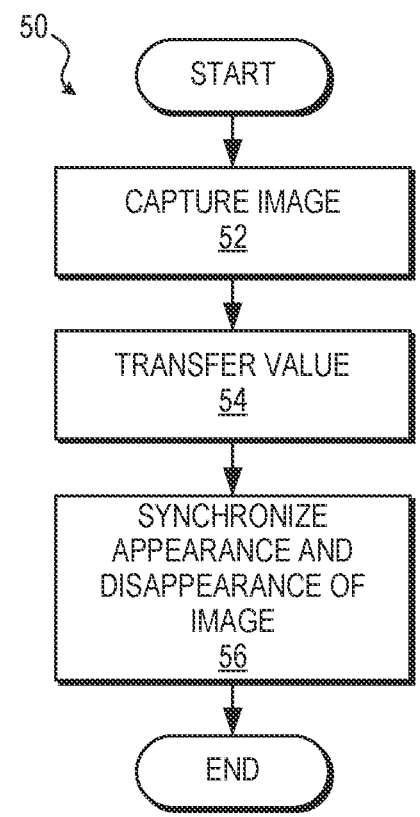
FIG. 4 is a flowchart of a method of receiving a value with synchronized appearance and disappearance of an image representative of the value at respective receiving and sending devices.
Figure 5:
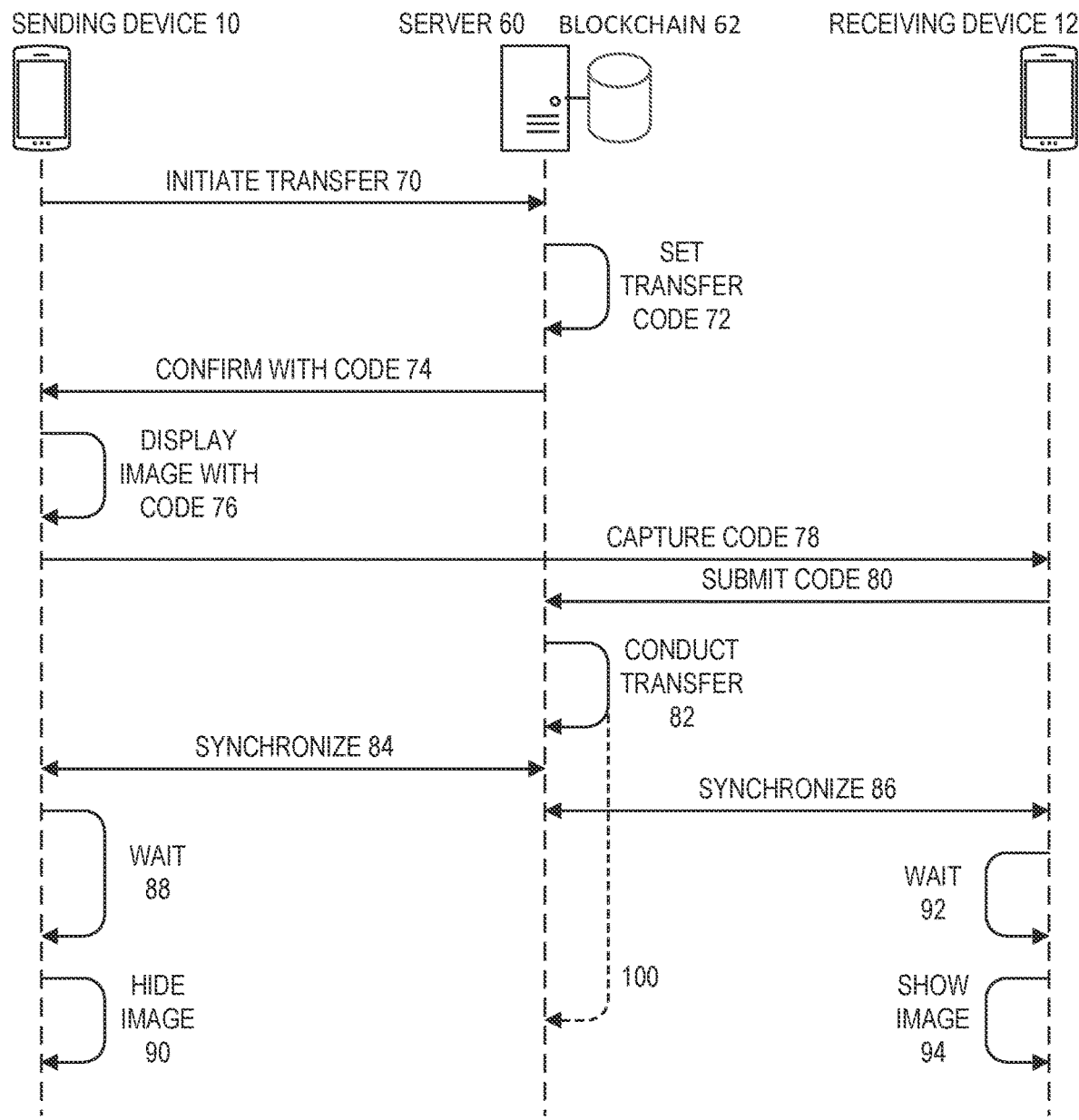
FIG. 5 is a signal diagram of an example transaction with synchronized appearance and disappearance of an image representative of the value of the transaction.

With reference to FIG. 4, the value-receiving mode instructions 34 may implement a value-receiving method 50 at the device 20 to receive a value from an account of another device 20 operating in the value-sending mode. The method 40 may be referenced for detail not repeated below, such as detail concerning the authentication and execution of the transfer by the service.

At block 52, the camera 24 of the receiving device 20 is controlled to capture an image representative of a value to be received by the account associated with the receiving device 20 from the account associated with the sending device 20. The image is captured while being displayed by the sending device, such as by block 42 of method 40.

At block 54, the communications interface 26 is controlled to participate in the transfer of the value represented by the capture image. This may include the communication of the account identifier 36 to the service as the receiving account for the value selected by the user of the sending device 20. As such, the service may be informed as the receiving account. It is noted that the receiving device 20 need not decode information in the image to determine the value because, by the time the receiving device 20 captures the image, the value has already been set by the sender. Rather, the receiving device 20 may decode information in the image to identify the transaction to which the associated receiving account is a party.

At block 56, the appearance of the image on the display device 22 of the receiving device 20 is synchronized with the disappearance of the image from the second device 20, so as to give the users of the devices 20 the impression that something physical has changed hands to complement the transfer of value at the service.

With reference to FIGS. 1A to 1C, synchronization of the appearance and disappearance of a value-representing image 14 may use a timer at each of the devices 10, 12 involved in the transaction. For example, the devices 10, 12 may communicate with each other or with a server to establish a common time and then carry out the appearance/disappearance of the image 14 at an agreed amount of time after the common time. The agreed time may be set so that the disappearance and appearance of the image 14 occur within, for example, about 2 seconds of each other.

For example, two devices 10, 12 may exchange information with a server to perform a transaction. During the exchange, the devices 10, 12 may inform the server of their local clock times. The server may select a duration required to complete the transaction, such as 0.5 seconds, and inform the devices 10, 12 to perform the appearance and disappearance of the image 14 at their respective local clock times plus this duration. Hence, even if the local clock times are quite different, the transition of the image from one device to another may be made in a synchronized manner.

In another example, the devices 10, 12 directly share information about their respective local clock times via a short-range communications system, such as Bluetooth™ or Wi-Fi™.

The duration selected (e.g., 0.5 seconds) may be selected to allow cancelation of the transaction if, for some reason, it fails. The window of time may encompass the expected time to carry out the transaction at the server with additional time to communicate a cancelation signal to the devices 10, 12, so that the devices 10, 12 do not appear/disappear the image 14 if the transaction fails.

The duration may be selected to account for communications and/or processing latency between the devices 10, 12 and server. This is to avoid disrupting the illusion of physical exchange by having the appearance of the image 14 on the receiving device 12 lag the disappearance of the image 14 on the sending device 10, or vice versa. For example, if the image 14 appears on the receiving device 12 a significant time before it disappears from the sending device 10, or vice versa, the users of the devices 10, 12 may be confused as to whether the transaction occurred properly or may just feel that the system does not accurately simulate physical exchange.

The synchronization is configured such that the image 14 does not appear on both of the devices 10, 12 and is not absent from both of the devices 10, 12 for longer than a predetermined time that is selected to visually simulate the physical conveyance of a physical object represented by the image 14. The predetermined time may be selected, for example, as 2 seconds, so that the image 14 does not appear on both of the devices 10, 12 for more than 2 seconds and/or is not absent from both of the devices 10, 12 for more than 2 seconds. This prevents the users from mistakenly believing that both or neither have the value. The synchronization may be so configured to achieve other such predetermined times, such as 1 second or 3 seconds, as long as the time provides the illusion of exchanging a physical object represented by the image 14.

It is also contemplated that the image 14 as displayed on the sending and receiving devices 10, 12 is substantially similar, if not identical. In various examples, the image 14 appears the same, so as to convey the illusion of physical transfer. Differences in how the image 14 is displayed, such as resolution, aspect ratio, brightness, and similar, may be required because of different configurations of the devices 10, 12. However, it is contemplated that such differences are expected by users and will not disrupt the illusion. In addition, small differences in the content of the image 14 may be tolerated, provided that they do not disrupt the illusion.

Figure 6:
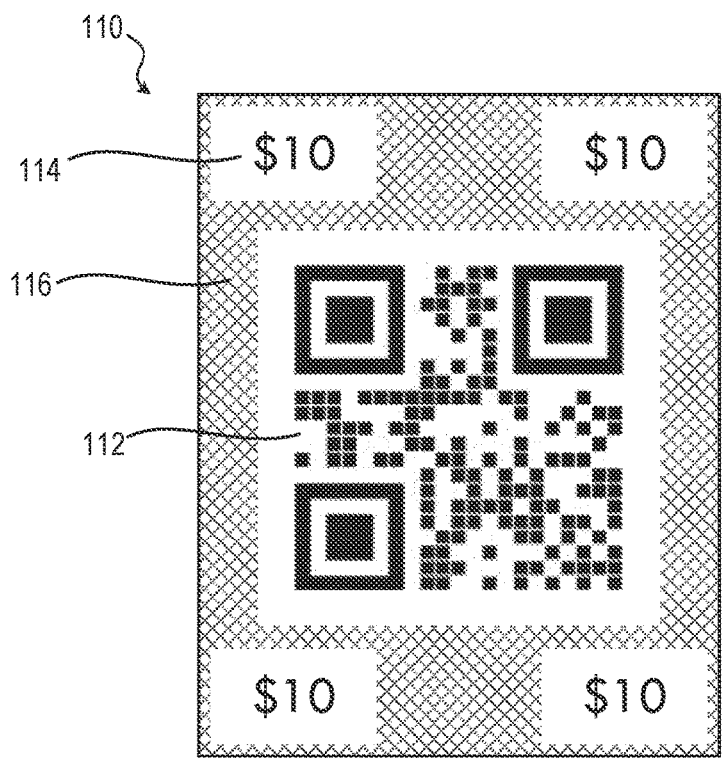
FIG. 6 is a diagram of an example value-representing image.

FIG. 6 shows an example of conducting a transfer with synchronized disappearance of an image that facilitates the transfer.

First, a sending device 10 initiates 70 a transfer with a server 60 that holds accounts for a cryptocurrency or similar electronic financial instrument. A user of the sending device 10 may log into their account and select an amount to transfer.

The server 60, in response, sets up the transfer by, for example, putting a hold on the amount selected by the sending user. Further, the server 60 sets a code 72 for the transfer. The code may be a unique identifier, such as a hash, that identifies the pending transfer. Anyone presenting this identifier to the server 60 would be considered the recipient of the transfer. Note that this is a simplification for explanatory purposes.

The server 60 then sends a confirmation 74 to the sending device 10 indicating that the transfer has been set up, in that it's a valid request with sufficient funds. The sever 60 also provides the code to the sending device 10.

The sending device 10 then displays 76 an image with the code, such as a barcode, QR code, or custom machine-readable code. The sending device 10 may generate the image on the basis of the code and/or the amount of the transfer, so that the image shows the code and/or amount or other signifier of the value.

The receiving device 12 then captures 78 the code as displayed by the sending device 10 by, for example, using a camera.

The receiving device 12 then submits 80 the code to the server 60 along with account information identifying the account of the recipient user of the receiving device 12.

The server 60 receives the code and the account identifier of the recipient and conducts 82 the transfer by, for example, posting the transfer to a blockchain.

The server 60 then synchronizes 84, 86 the sending and receiving devices 10, 12, so that the image may appear to move from the sending device 10 to the receiving device. To synchronize 84 with the sending device 10, the server 60 requests a local clock time of the sending device 10, adds a delta time to the sender's local clock time to obtain local image-disappearance time, and then communicates the local image-disappearance time to the sending device 10. Likewise, to synchronize 86 with the receiving device 12, the server 60 requests a local clock time of the receiving device 12, adds a delta time to the receiver's local clock time to obtain local image-appearance time, and then communicates the local image-appearance time to the receiving device 12.

The sending device 10 waits 88 until the image-disappearance time occurs, and then hides 90 the image. Likewise, the receiving device 10 waits 92 until the image-appearance time occurs, and then shows 94 the image. The durations waited 88, 92 may be different (e.g., due to network latency, or clock differences in the devices), whereas they end at substantially the same time. Note that the receiving device 12 may generate the image independently of the sending device 10 doing same on the basis of the code and/or the amount of the transfer, so that the image shows the code and/or amount or other signifier of the value. The code may bear the amount transferred or the server 60 may communicate the amount to the receiving device 12.

As such, the image that represents the value of the transaction is removed from the sending device 10 at about the same time that it is displayed on the receiving device 12.

An alternate transfer 100 may actually take more time than is needed to synchronize the devices 10, 12 to hide and show the image. The synchronization provided by 84-92 may be conducted in parallel with most or all of the time it takes to perform the transfer. This approach may be useful in systems that need significant time to conduct the transfer, provided that the risk that the transfer cannot be completed is tolerable.

FIG. 6 shows an example image 110 that is machine-capturable and conveys a sense of value to users.

The image 110 may include a machine-readable code 112 to trigger the transfer of a value. In this example, the code 112 is a QR code. Various other examples of machine-readable codes are discussed elsewhere herein.

The image 110 may include a human-readable indication 114 of the value, such as a number representing the amount in a specific national currency or cryptocurrency. Various different values may be shown at the same time.

The image 110 may include a predominant color 116 (shown by crosshatching) representative of the value.

Figure 7:
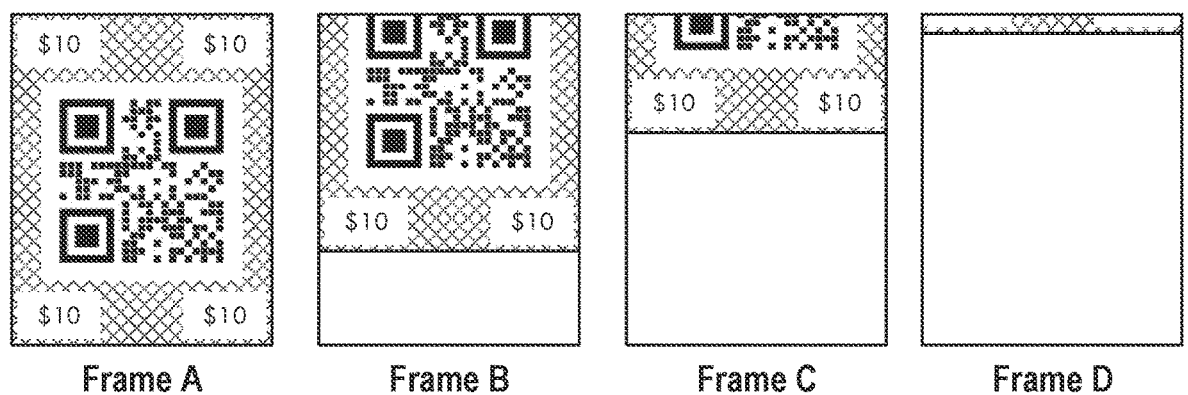
FIG. 7 is a diagram of an example animation of a value-representing image.

FIG. 7 shows an example animation for the value-representing image 110 of FIG. 6. A device may play such an animation when synchronizing the disappearance/appearance of the image 110. For example, a sending device may play a sending animation as the sequence of frames A-B-C-D to cause the image 110 to disappear, whereas a receiving device may play a receiving animation as the sequence of frames D-C-B-A to cause the image 110 to appear.

It should be apparent from the above that a transfer of value may be signified in an intuitive way, so as to promote the use of computerized currencies and payment systems, such as cryptocurrencies, and give the users the same impression as exchanging cash or other physical object.

It should be recognized that features and aspects of the various examples provided above can be combined into further examples that also fall within the scope of the present disclosure. In addition, the figures are not to scale and may have size and shape exaggerated for illustrative purposes.

What is claimed is:

1. A portable electronic device comprising:
   a display device;
   a camera;
   a communications interface; and
   a processor connected to the display device, the camera, and the communications interface, the processor to operate in a value-sending mode and a value-receiving mode;
   wherein, in the value-sending mode, the processor is to:
      control the display device to display an image representative of a value to be sent from an account associated with the portable electronic device to an account associated with another portable electronic device that is in the value-receiving mode;
      control the communications interface to participate in a transfer of the value to be sent between the accounts in response to the other portable electronic device capturing the image with its camera; and
      synchronize, with a server or server system, disappearance of the image from the display device with appearance of the image at the other portable electronic device;
   wherein, in the value-receiving mode, the processor is to:
      control the camera to capture an image representative of a value to be received by the account associated with the portable electronic device from the account associated with the other portable electronic device that is in the value-sending mode, wherein the image is captured while displayed by the other portable electronic device;

control the communications interface to participate in a transfer of the value to be received in response to capture of the image; and synchronize, with the server or server system, appearance of the image on the display device with disappearance of the image from the other portable electronic device.

2. The portable electronic device of claim 1, wherein the processor is to agree on a time with the other portable electronic device to synchronize the disappearance and appearance of the image, such that the disappearance and appearance of the image occur within about 2 seconds of each other.

3. The portable electronic device of claim 1, wherein the image does not appear on both of the portable electronic devices for more than 2 seconds.

4. The portable electronic device of claim 3, wherein the image is not absent from both of the portable electronic devices for more than 2 seconds.

5. The portable electronic device of claim 1, wherein the processor is to synchronize disappearance and appearance of the image with the other portable electronic device to provide an illusion of users of the portable electronic devices exchanging a physical object represented by the image.

6. The portable electronic device of claim 1, wherein the image does not appear on both of the portable electronic devices and is not absent from both of the portable electronic devices for longer than a predetermined time that is selected to visually simulate the physical conveyance of a physical object represented by the image.

7. The portable electronic device of claim 1, wherein the image as displayed on the sending or receiving portable electronic device is substantially similar to the image as displayed on the display device of the portable electronic device.

8. The portable electronic device of claim 1, wherein the image contains a machine-readable code to trigger the transfer of the value between the accounts.

9. The portable electronic device of claim 8, wherein the image contains a human-readable indication of the value.

10. The portable electronic device of claim 9, wherein the image contains a predominant color representative of the value.

11. The portable electronic device of claim 1, wherein the processor is to control the communications interface to conduct the transfer using a blockchain.

12. The portable electronic device of claim 1, wherein synchronizing the disappearance and appearance of the image includes playing respective animations at the portable electronic devices at a time agreed by the portable electronic devices.

* * * * *